Nov. 5, 1929.  F. J. BROWN  1,734,471
GRATING

Filed Aug. 8, 1928

INVENTOR
Frank J. Brown

Patented Nov. 5, 1929

1,734,471

UNITED STATES PATENT OFFICE

FRANK J. BROWN, OF PITTSBURGH, PENNSYLVANIA

GRATING

Application filed August 8, 1928. Serial No. 298,356.

This invention relates generally to gratings and more particularly to reticulated gratings fabricated from flat steel bars and welded together.

My grating is adapted for use in openings on sidewalks, to provide protection for pedestrians by placing over manholes, as stair treads, platforms, floorings, runways, and in general for any purpose where strength of flooring, light and ventilation are important factors in the selection of a flooring element.

In the drawings which illustrate several preferred embodiments of my invention,

Figure 1:
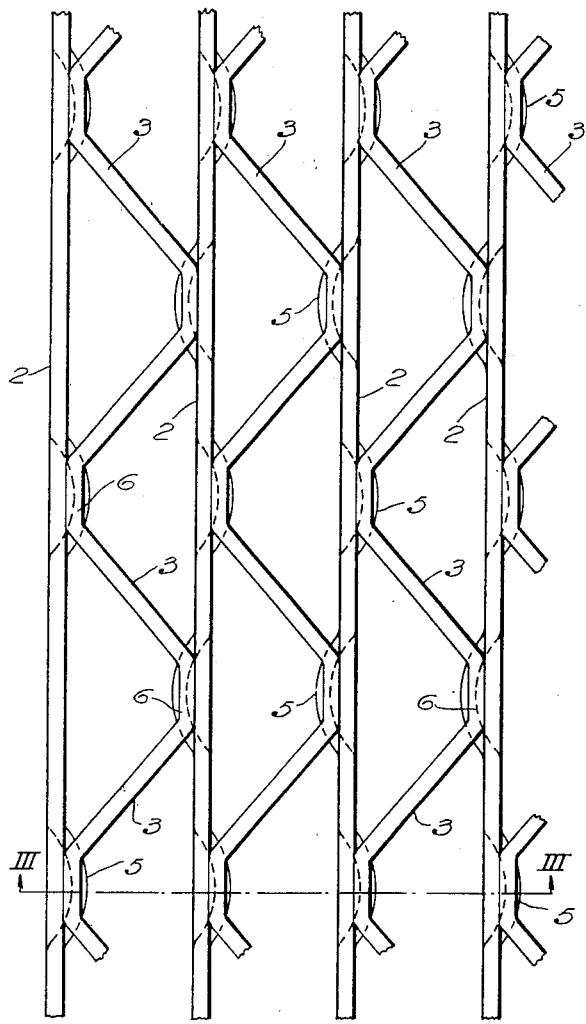
Figure 1 is a plan view of a grating embodying my invention.
Figure 2:
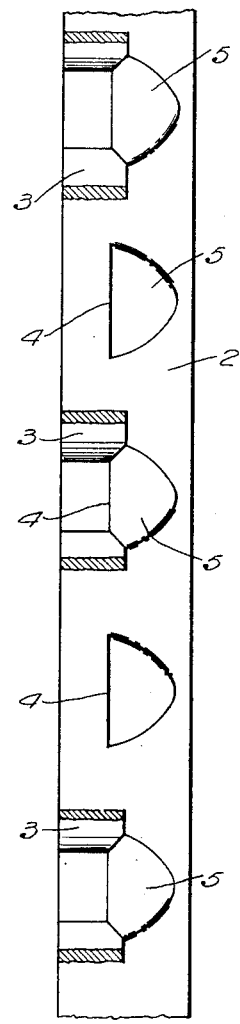
Figure 2 is a side elevation.
Figure 3:
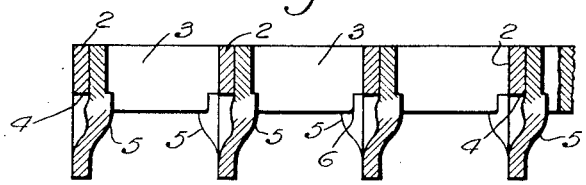
Figure 3 is a section taken on the line III—III of Figure 1.

Referring to the preferred embodiment of the invention shown in Figures 1, 2 and 3, the grating comprises a plurality of carrier bars 2 connected by cross bars 3. The carrier bars are provided with a series of spaced slits 4 extending longitudinally of the bars. The portions of the carrier bars adjacent the slits 4 are expanded to form cup-like supports 5 for the cross bars. The cross bars 3 are formed of an angular zigzag shape and are connected, as indicated at 6, to the supports 5. As shown in Figure 3, this connection is made by welding the parts together and preferably by exerting some pressure on the elements during the welding operation.

This provides a reticulated grating in which the carrier bars are connected together by cross bars welded to portions of the carrier bars which have been formed by providing slits in the carrier bars and expanding the metal adjacent the slits. The connection between the carrier bars and the cup-like supports is such that the cross bars intersect and overlap the supports, thus providing a large welding surface for securing the cross bars to the supports.

My invention provides a grating in which the elements which form the grating are each of substantially the same dimensions. In connecting the elements together by a welding process this equality in the elements is important for the reason that it is conducive to equal heating of the elements. Where a grating is formed of elements which are not of approximately the same dimensions, the tendency for the elements of smaller cross section is to get too hot and sometimes to burn.

My grating in effect is formed of an upper and lower layer of elements. In welding these elements together by a welding process in which pressure is exerted during the welding operation, the pressure may be applied exactly where it is desired, whereas in some gratings in which three layers of elements are employed to form the grating it is extremely difficult to apply the pressure where desired during the welding operation.

It is to be understood that the forms of the invention herewith shown and described are to be taken as preferred examples of the same, and that the invention may be otherwise modified without departing from the spirit of the invention or the scope of the following claims.

I claim:

1. A reticulated grating comprising a plurality of carrier bars having portions thereof slit and expanded to form supports for cross bars, and a plurality of cross bars secured to the supports.

2. A reticulated grating comprising a plurality of carrier bars having portions thereof slit and expanded to form supports for cross bars, and a plurality of cross bars secured to the supports in overlapping relationship.

3. A reticulated grating comprising a plurality of carrier bars having portions thereof slit and expanded to form supports for cross bars, and a plurality of cross bars connected to the supports on adjacent carrier bars, the connection between the supports and cross bars being such that the cross bars intersect and overlap the supports.

4. A reticulated grating comprising a plurality of carrier bars provided with a series of slits extending longitudinally of the bars, the portions of the bars adjacent the slits being bent to form cup-like supports for cross bars, and cross bars extending between and welded to the cup-like supports.

5. A reticulated grating comprising a plurality of carrier bars provided with spaced slits extending longitudinally thereof, portions of the bars adjacent the slits being bent to form cup-like supports extending alternately on opposite sides of the carrier bars, and cross bars extending between adjacent carrier bars and welded to said cup-like supports.

6. A reticulated grating comprising a plurality of carrier bars provided with spaced slits extending longitudinally thereof, portions of the bars adjacent the slits being bent to form cup-like supoprts extending alternately on opposite sides of the carrier bars, and substantially U-shaped cross bars extending between adjacent carrier bars and welded to said cup-like supports.

7. A reticulated grating comprising a plurality of carrier bars provided with spaced slits extending longitudinally thereof, portions of the bars adjacent the slits being bent to form cup-like supports extending alternately on opposite sides of the carrier bars, and substantially U-shaped cross bars extending between adjacent carrier bars and welded to said cup-like supports, the cross bars and supports being arranged in overlapping relationship.

In testimony whereof I have hereunto set my hand.

FRANK J. BROWN.